United States Patent
Woods et al.

(10) Patent No.: US 7,193,016 B1
(45) Date of Patent: Mar. 20, 2007

(54) EPOXY-EXTENDED POLYACRYLATE TOUGHENING AGENT

(75) Inventors: John G. Woods, Farmington, CT (US); Mark M. Konarski, Old Saybrook, CT (US); Kyra M. Kozak, Rocky Hill, CT (US); Yuhshi Luh, Orange, CT (US)

(73) Assignee: Henkel Corporation, Rocky Hill, CT (US)

( * ) Notice: Subject to any disclaimer, the term of this patent is extended or adjusted under 35 U.S.C. 154(b) by 331 days.

(21) Appl. No.: 10/692,935

(22) Filed: Oct. 27, 2003

(51) Int. Cl.
*C08F 8/08* (2006.01)
*C08L 63/00* (2006.01)
*C08L 63/02* (2006.01)

(52) U.S. Cl. .................. 525/113; 525/109; 525/110; 525/114; 525/115; 525/119; 525/327.4; 525/329.5; 525/330.1

(58) Field of Classification Search .................. None
See application file for complete search history.

(56) References Cited

U.S. PATENT DOCUMENTS

| | | | | |
|---|---|---|---|---|
| 4,460,746 A | * | 7/1984 | Fock et al. | 525/117 |
| 4,722,981 A | | 2/1988 | Koenig et al. | 525/481 |
| 5,447,988 A | | 9/1995 | Dershem et al. | 524/780 |
| 6,489,412 B1 | * | 12/2002 | Okamoto et al. | 526/126 |

FOREIGN PATENT DOCUMENTS

| | | | |
|---|---|---|---|
| JP | 61254680 A | * | 11/1986 |
| JP | 11092711 A | * | 4/1999 |
| JP | 2000-344823 | | 12/2000 |

OTHER PUBLICATIONS

Wang et al., "Photosynthesis and Application of Polyfunctional Poly(n-Butyl Acrylate) Elastomers for Use in Epoxy Resin Toughening," Journal of Applied Polymer Science, vol. 44, 1992, pp. 789-797.*
Costello et al., "Branched methacrylate copolymers from multifunctional monomers: chemical composition and physical architecture distributions,", Polymer, 2002, pp. 245,254.*
Gazit, S. and Bell, J. P., "Synthesis and Analysis of Saturated, Reactive n-Butyl Acrylate Polymers for Use in Epoxy Resin Toughening," Epoxy Resin Chemistry II, ACS Symposium Series 221, pp. 55-67, Bauer, R.S., ed. (1983).
Gazit, S. and Bell, J. P., "Impact Performance of Epoxy Resins with Poly(n-butyl acrylate) as the Reactive Liquid Rubber Modifier", Epoxy Resin Chemistry II, ACS Symposium Series 221, pp. 69-83 (1983).
Banthia, A. K., Chaturvedi, P. N., Jha, V. and Pendyala, V. N. S., "Synthesis, Characterization, and Evaluation of Telechelic Acrylate Oligomers and Related Toughened Epoxy Networks", *Rubber-Toughened Plastics*, ACS Advances in Chem. Series 222, C.K., ed. (1987).
Ratna, D. and Banthia, A. K,, "Toughening of Epoxy Resin by Modification with 2-Ethylhexyl Acrylate-Acryllic Acid Copolymers", *Polym Int.*, 49, 309-15 (2000).
Costello, P. A., Martin, I. K., Slark, A. T., Sherrington, D. C., Titterton, A., "Branched Methacrylate Copolymers from Multifunctional Monomers: Chemical Composition and Physical Architecture Distributions," *Polymers*, 43, pp. 245-254 (2002).
Drake, R.S., Egan, D. R., Murphy, W. T., "Elastomer-Modified Epoxy Resins in Coatings Applications", *Epoxy Resin Chemistry II*, ACS Symposium Series 221, pp. 1-20, Bauer, R.S., ed. (1983).
Kinloch, A., "Relationships Between the Microstructure and Fracture Behavior of Rubber-Toughened Thermosetting Polymers", *Rubber-Toughened Plastics*, ACS Advances in Chem. Series 222, pp. 67-91, Riew, C., ed. (1989).

* cited by examiner

*Primary Examiner*—Robert Sellers
(74) *Attorney, Agent, or Firm*—Steven C. Bauman

(57) ABSTRACT

In accordance with the present invention, there are provided toughening agents which are useful for improving the performance properties of epoxy-based adhesive formulations. For example, epoxidized polybutylacrylates have been found to be useful toughening agents of component level underfill adhesive compositions. Invention materials are generally liquid rubbers which provided improved fracture toughness while maintaining satisfactory capillary flow properties. Invention materials can be synthesized in neat (solventless) reactions from readily available low-cost raw materials and isolated in high yields. They have a branched telechelic structure with terminal epoxide functional groups. The polyacrylate is typically obtained as a mixture of epoxidized polymer, chain extended polyoligomer and unreacted monomer. Invention materials are compatible with common epoxy formulations and may be used without purification. At low levels of incorporation, they provide adhesives that meet the minimum fracture toughness (Gq>2.0 lb/in) and capillary flow specifications (flow time<180 seconds) for many commercial underfill applications. In accordance with a further embodiment of the present invention, there are provided adhesive compositions comprising invention compounds and methods for use thereof. In additional embodiments of the present invention, there are provided methods for the preparation of invention toughening agents, methods for adhesively attaching a device to a substrate, and assemblies comprising first article(s) adhered to second article(s).

5 Claims, 4 Drawing Sheets

EPOXY-EXTENDED POLYACRYLATE TOUGHENING AGENT

FIELD OF THE INVENTION

The present invention relates to compounds and formulations useful for improving the toughness of adhesive compositions and methods for use thereof. In a particular aspect, the present invention relates to epoxy-based resin formulations having improved fracture toughness. In another aspect, the present invention relates to methods for improving the fracture toughness of epoxy-based resin formulations. In still another aspect, the present invention relates to methods for preparing toughening agents useful for improving the fracture toughness of epoxy-based resin formulations.

BACKGROUND OF THE INVENTION

Toughness is the ability of a material to absorb energy and undergo large permanent set without rupture. For many engineering adhesive applications, toughness is often the deciding factor. Plastics, because of their inherent brittleness, have been modified in a variety of ways in efforts to improve the toughness thereof. Epoxy resins, for example, which form a versatile glassy network, exhibit excellent resistance to corrosion and solvents, good adhesion, reasonably high glass transition temperatures ($T_g$) and adequate electrical properties. Unfortunately, however, the poor fracture toughness of epoxy resins oftentimes limits the usefulness thereof.

The impact strength as well as most other physical properties of crosslinked epoxy resins is controlled by the chemical structure and ratio of the epoxy resin and hardener, by any added fillers, and by the curing conditions used. Unfortunately, crosslinked, glassy epoxy resins with relatively high $T_g$ (>100° C.) are brittle. The poor impact strength of high glass transition epoxy resins limits the usage of epoxies as structural materials and in composites.

Indeed, current commercially available underfill epoxy adhesives are excessively brittle and tend to fail prematurely in such applications as chip scale packaging (CSP) and related applications as a result of poor fracture toughness. Conventional toughening agents (e.g. carboxyl terminated butadiene, i.e., CTBN) are frequently unsuitable as additives in these adhesives because they adversely affect the capillary flow properties of the uncured adhesive.

Accordingly, there is a need for toughening agents that are effective for improving the toughness of adhesive formulations, especially in formulations requiring good capillary flow properties.

SUMMARY OF THE INVENTION

In accordance with the present invention, there are provided toughening agents which are useful for improving the performance properties of epoxy-based adhesive formulations. For example, epoxidized polyacrylates have been found to be useful toughening agents of component level underfill adhesive compositions. Invention materials are generally liquid rubbers which provide improved fracture toughness while maintaining satisfactory capillary flow properties. Invention materials can be synthesized in neat (solventless) reactions from readily available low-cost raw materials and isolated in high yields. They have a branched structure with terminal epoxide functional groups. The polyacrylate is typically obtained as a mixture of epoxidized polymer, chain extended poly-oligomer and unreacted monomer. Invention materials are compatible with common epoxy formulations and may be used without purification. At low levels of incorporation, they provide adhesives that meet the minimum fracture toughness (Gq>2.0 lb/in) and capillary flow specifications (i.e., flow, by capillary force, a distance of 20 mm through a 2-mil gap between a pair of microscope slides in <180 seconds at 120° C.) for many commercial underfill applications.

In accordance with a further embodiment of the present invention, there are provided adhesive compositions comprising invention compounds and methods for use thereof.

In additional embodiments of the present invention, there are provided methods for the preparation of invention toughening agents, methods for adhesively attaching a device to a substrate, and assemblies comprising first article(s) adhered to second article(s).

DETAILED DESCRIPTION OF THE INVENTION

Figure 1:
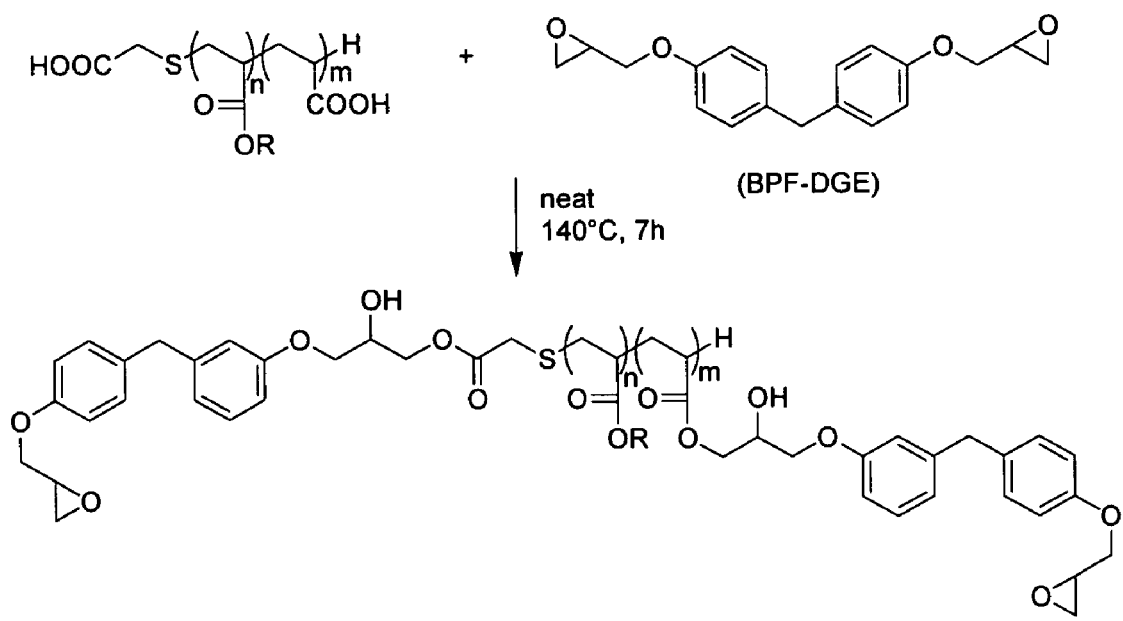
FIG. 1 illustrates the synthesis of an epoxidized poly (alkyl acrylate-co-acrylic acid) by reaction of bisphenol F diglycidyl ether (BPF-DGE) with a copolymer prepared by copolymerization of alkyl acrylate and acrylic acid in the presence of mercaptoacetic acid as a chain transfer agent.

In accordance with the present invention, there are provided toughening agents comprising an epoxy-extended polyacrylate, wherein the polyacrylate from which the epoxy-extended polyacrylate is derived has a number average molecular weight in the range of about 1000 up to about 10,000, an average functionality of at least about 2.2, and a polydispensity in the rage of about 1.05 up to about 5. Presently preferred toughening agents according to the present invention are liquid, typically having a viscosity in the range of about 5 up to about 500 Pascal-seconds at 25°

C. (1 milliPascal-second=1 centipoise), with viscosities in the range of about 20 up to about 200 Pascal-seconds at 25° C. being presently preferred.

As employed herein, "functionality" refers to the number of functional equivalents (determined by suitable means, e.g., by acid-base titration in the case of a carboxylic acid) times the number average molecular weight divided by the weight of the sample being analyzed is the calculated average number of functional groups per chain of the polyacrylate.

As employed herein, "polydispensity" (also known as "polydispersity index" and "molecular weight distribution") refers to the ratio of weight average molecular weight/number average molecular weight for a subject polymer. This value provides an indication of the broadness of the molecular weight distribution of the subject polymer. Thus, for a monodisperse polymer where the weight average molecular weight equals the number average molecular weight, the value will be 1. As the breadth of molecular weight distribution increases, the polydispersity will be greater than 1.

Invention toughening agents can be prepared from polyacrylates bearing a variety of functionalities, e.g, carboxylic acids, amines, anhydrides, hydroxy groups, thiol groups, phenolic groups, and the like. As noted above, the polyacrylates employed for the preparation of invention toughening agents have a functionality of at least about 2.2, with a functionality of at least about 2.5 (and no greater than about 5) being presently preferred.

Presently preferred toughening agents according to the present invention are those wherein the epoxy-extended polyacrylate is prepared by reacting a carboxylic acid functionalized polyacrylate with a multi-functional epoxy monomer. Exemplary polyacrylates contemplated for use in the practice of the present invention include the poly-functional or branched polymers prepared as disclosed in JP 00344823A (S. Okamota et al Jap. Patent Appl. P2000-128911A to Soken Chemical and Engineering Co. Ltd. (2000)), incorporated by reference herein in its entirety (e.g., a copolymer prepared employing a 10:1 ratio of methyl acrylate to trimethylolpropane triacrylate in the presence of mercaptopropionic acid chain transfer agent), or from carboxylic acid functionalized branched polyacrylates prepared by polymerization of blends of mono acrylates and divinyl branching agents in the presence of carboxylic acid functionalized chain transfer agents and/or carboxylic acid functionalized initiators by a process similar to that described by P. A. Costello et al in *Polymer* 2002, 43, 245–254.

Presently preferred polyacrylates contemplated for use in the practice of the present invention are further characterized by one or more of the following parameters: being a liquid at room temperature, having a number average molecular weight in the range of about 1000 up to about 5000, having as the principle repeating unit n-butyl acrylate, 2-ethylhexyl acrylate, isooctyl acrylate, and the like, functionalized with carboxylic acid groups via such monomers as acrylic acid, methacrylic acid, maleic acid, maleic anhydride, carboxylic acid functionalized chain transfer agents, carboxylic acid functionalized initiators, carboxylic acid functionalized co-monomers, and the like.

Multi-functional epoxy monomers contemplated for use in the preparation of invention toughening agents include bisphenol F diglycidyl ether, bisphenol A diglycidyl ether, 4-vinyl-1-cyclohexene diepoxide, butanediol diglycidyl ether, neopentylglycol diglycidyl ether, 3,4-epoxycyclohexylmethyl-3,4-epoxycyclohexanecarboxylate, limonene diepoxide, hexanediol diglycidyl ether, trimethylolpropane triglycidyl ether, aniline diglycidyl ether, diglycidyl ether of propylene glycol, cyanuric acid triglycidyl ether, ortho-phthalic acid diglycidyl ether, diglycidyl ester of linoleic dimer acid, dicyclopentadiene diepoxide, diglycidyl ether of tetrachloro bisphenol A, 1,1,1-tris(p-hydroxypenyl)ethane glycidyl ether, tetra glycidyl ether of tetrakis(4-hydroxyphenyl)ethane, epoxy phenol novolac resins, epoxy cresol novolac resins, tetraglycidyl-4,4'-diaminodiphenylmethane, and the like.

When functional polyacrylates contemplated for use herein are contacted with multi-functional epoxy monomers for the preparation of invention toughening agents, it is preferred that a stoichiometric excess of the multi-functional epoxy monomer be employed in the preparation of the epoxy-extended polyacrylate. It is especially preferred that a sufficient excess of the multi-functional monomer be employed so as to prevent gellation of the reaction mixture.

In accordance with another embodiment of the present invention, invention toughening agents further comprise unreacted multi-functional epoxy monomer. Thus, as little as a few percent by weight of the unreacted epoxy monomer may be present as part of the invention toughening agent, with as much as 50 percent by weight, or more, of the invention toughening agent comprising unreacted epoxy monomer from which the epoxy-extended polyacrylate is prepared.

The epoxy extension can be linked to the above-described polyacrylate materials by any of the following structures:

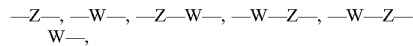

and combinations of any 2 or more thereof, wherein:

each Z is independently alkylene, substituted alkylene, cycloalkylene, substituted cycloalkylene, heterocyclic, substituted heterocyclic, oxyalkylene, substituted oxyalkylene, alkenylene, substituted alkenylene, arylene, substituted arylene, alkarylene, substituted alkarylene, aralkylene or substituted aralkylene, and each W is independently ester, reverse ester, thioester, reverse thioester, amide, reverse amide, silyl, carbonate, or carbamate.

As employed herein, "alkyl" refers to hydrocarbyl radicals having 1 up to about 20 carbon atoms, preferably 2–10 carbon atoms; and "substituted alkyl" comprises alkyl groups further bearing one or more substituents selected from alkoxy, cycloalkyl, substituted cycloalkyl, heterocyclic, substituted heterocyclic, aryl, substituted aryl, heteroaryl, substituted heteroaryl, aryloxy, substituted aryloxy, halogen, cyano, nitro, amido, C(O)H, acyl, oxyacyl, carboxyl, carbamate, sulfonyl, sulfonamide, sulfuryl, and the like.

As employed herein, "cycloalkyl" refers to cyclic ring-containing groups containing in the range of 3 up to about 8 carbon atoms, and "substituted cycloalkyl" refers to cycloalkyl groups further bearing one or more substituents as set forth above.

As employed herein, "alkenyl" refers to straight or branched chain hydrocarbyl groups having at least one unit of ethylenic unsaturation, i.e., a carbon-carbon double bond, and having in the range of 2 up to about 12 carbon atoms, and "substituted alkenyl" refers to alkenyl groups further bearing one or more substituents as set forth above.

As employed herein, "unit of ethylenic unsaturation" refers to unsaturation comprising localized (i.e., non-aromatic) carbon-carbon double bonds, as shown below:

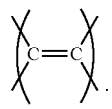

As employed herein, "cycloalkenyl" refers to cyclic ring-containing groups containing in the range of 3 up to about 8 carbon atoms, wherein the cyclic ring-containing group contains at least one carbon-carbon double bond. "Substituted cycloalkenyl" refers to cycloalkenyl groups further bearing one or more substituents as set forth above. Cycloalkenyl groups as defined herein also refer to bicycloalkenyl groups, such as, for example, 2.2.1.-bicycloheptene, and the like.

As employed herein, "aryl" refers to aromatic groups having in the range of 6 up to about 14 carbon atoms and "substituted aryl" refers to aryl groups further bearing one or more substituents as set forth above.

As employed herein, "alkylene" refers to divalent hydrocarbyl radicals having 1 up to about 20 carbon atoms, preferably 2–10 carbon atoms; and "substituted alkylene" comprises alkylene groups further bearing one or more substituents as set forth above.

As employed herein, "cycloalkylene" refers to divalent cyclic ring-containing groups containing in the range of 3 up to about 8 carbon atoms, and "substituted cycloalkylene" refers to cycloalkylene groups further bearing one or more substituents as set forth above.

As employed herein, "alkenylene" refers to divalent, straight or branched chain hydrocarbyl groups having at least one carbon-carbon double bond, and having in the range of 2 up to about 12 carbon atoms, and "substituted alkenylene" refers to alkenylene groups further bearing one or more substituents as set forth above.

As employed herein, "arylene" refers to divalent aromatic groups having in the range of 6 up to about 14 carbon atoms and "substituted arylene" refers to arylene groups further bearing one or more substituents as set forth above.

As employed herein, "alkarylene" refers to an arylene group bearing an alkyl substituent and "substituted alkarylene" refers to alkarylene groups further bearing one or more substituents as set forth above.

As employed herein, "aralkylene" refers to an alkylene group bearing an aryl substituent and "substituted aralkylene" refers to aralkylene groups further bearing one or more substituents as set forth above.

As employed herein, "oxyalkylene" refers to the moiety —O-alkylene-, wherein alkylene is as defined above, and "substituted oxyalkylene" refers to oxyalkylene groups further bearing one or more substituents as set forth above.

As employed herein, "heterocyclic" refers to cyclic (i.e. ring containing) groups containing one or more heteroatoms (e.g. N, O, S, or the like) as part of the ring structure, and having in the range of 3 up to 20 carbon atoms, and "substituted heterocyclic" refers to heterocyclic groups further bearing one or more substituents as set forth above.

Invention toughening agents can be readily prepared in a variety of ways, e.g., a neat mixture of the polyacrylate and a multi-functional epoxy monomer can be subjected to a temperature in the range of about 100 up to about 150° C. for a time in the range of about 1 up to about 24 hours in the substantial absence of a catalyst. Preferably, reaction is carried out in a stoichiometric excess of epoxy monomer, which excess can optionally be removed when the reaction is complete, or can be retained as part of the reaction mixture and added directly to the epoxy resin to be modified.

In accordance with still another embodiment of the present invention, there are provided methods to improve the fracture toughness of an epoxy-based adhesive composition, the methods comprising adding to the adhesive composition an effective amount of an invention toughening agent. As little as about 2 weight percent invention toughening agent, up to about 25 weight percent invention toughening agent can be employed in the practice of the present invention.

In accordance with yet another embodiment of the present invention, there are provided adhesive formulations comprising:
 a curable epoxy resin,
 a curing agent,
 at least one toughening agent according to the invention; and
 optionally, a filler.

In one aspect of the invention, the above-described adhesive formulations contain substantially no latent curing agent; and the cure onset temperature of the curable epoxy resin is less than about 220° C. Such formulations are especially useful in non-fluxing underfill applications.

In another aspect of the present invention, the performance properties (e.g., toughness) of underfill sealant compositions is improved by adding invention toughening agents thereto. Such formulations typically comprise an epoxy resin component, a secondary amine-based adhesion promoting component and a curative based on the combination of a nitrogen containing compound and a transition metal complex. Reaction products of these compositions demonstrate improved adhesion, improved resistance to moisture absorption, and improved resistance to stress cracking.

Typically, the composition includes about 60 to about 95.8 weight percent of the epoxy resin component (which includes up to about 10 weight percent of invention toughening agent), about 5 to about 30 weight percent of the secondary amine-based adhesion promoting component, and about 0.2 to about 10 weight percent of the curative, of which about 80 to about 98 weight percent is comprised of the nitrogen containing compound and about 2 to about 20 weight percent is comprised of the transition metal complex.

The epoxy resin component of the present invention may include any common epoxy resin, which may have at least one multifunctional epoxy resin.

Examples of such epoxy resins include $C_4$-$C_{28}$ alkyl glycidyl ethers; $C_2$-$C_{28}$ alkyl- and alkenyl-glycidyl esters; $C_1$-$C_{28}$ alkyl-, mono- and poly-phenol glycidyl ethers; polyglycidyl ethers of pyrocatechol, resorcinol, hydroquinone, 4,4'-dihydroxydiphenyl methane (or bisphenol) F, such as RE-404-S or RE-410-S available commercially from Nippon Kayuku, Japan), 4,4'-dihydroxy-3,3'-dimethyldiphenyl methane, 4,4'-dihydroxydiphenyl dimethyl methane (or bisphenol A), 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris(4-hydroxyphenyl)methane; polyglycidyl ethers of transition metal complex chlorination and bromination products of the above-mentioned diphenols; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms; N,N'-diglycidyl-aniline; N,N'-dimethyl-N,N'-diglycidyl-4,4'-diaminodiphenyl methane; N,N,N',N'-tetraglycidyl-4,4'-diaminodiphenyl methane; N,N'-diglycidyl-4-aminophenyl glycidyl ether; N,N,N',N'-tetraglycidyl-1,3-propylene bis-4-aminobenzoate; phenol novolac epoxy resin; cresol novolac epoxy resin; and combinations thereof.

Among the commercially available epoxy resins suitable for use herein are polyglycidyl derivatives of phenolic compounds, such as those available under the tradenames EPON 828, EPON 1001, EPON 1009, and EPON 1031, from Shell Chemical Co.; DER 331, DER 332, DER 334, and DER 542 from Dow Chemical Co.; GY285 from Ciba Specialty Chemicals, Tarrytown, N.Y.; and BREN-S from Nippon Kayaku, Japan. Other suitable epoxy resins include polyepoxides prepared from polyols and the like and polyglycidyl derivatives of phenol-formaldehyde novolacs, the latter of which are available commercially under the tradenames DEN 431, DEN 438, and DEN 439 from Dow Chemical Company. Cresol analogs are also available commercially ECN 1235, ECN 1273, and ECN 1299 from Ciba Specialty Chemicals. SU-8 is a bisphenol A-type epoxy novolac available from Shell Chemicals (formerly, Interez, Inc.). Polyglycidyl adducts of amines, aminoalcohols and polycarboxylic acids are also useful in this invention, commercially available resins of which include GLYAMINE 135, GLYAMINE 125, and GLYAMINE 115 from F.I.C. Corporation; ARALDITE MY-720, ARALDITE MY-721, ARALDITE 0500, and ARALDITE 0510 from Ciba Specialty Chemicals and PGA-X and PGA-C from the Sherwin-Williams Co. And of course combinations of the different epoxy resins are also desirable for use herein.

As noted above, the epoxy resin component of the present invention may include any common epoxy resin, at least a portion of which is a multifunctional epoxy resin. Ordinarily, the multifunctional epoxy resin should be included in amount within the range of about 20 weight percent to about 100 weight percent of the epoxy resin component.

A monofunctional epoxy resin, if present, should ordinarily be used as a reactive diluent, or crosslink density modifier. In the event such a monofunctional epoxy resin is included as a portion of the epoxy resin component, such resin should be employed in an amount of up to about 20 weight percent, based on the total epoxy resin component.

In choosing epoxy resins for the epoxy resin component of the compositions of the present invention, consideration should also be given to viscosity and other properties thereof.

Additional polymerizable co-reactants contemplated for optional use in the practice of the present invention include, for example maleimides, nadimides, itaconamides, cyanate esters, vinyl ethers, acrylates, styrenes, and the like.

The secondary amine-based adhesion promoting component should have at least two secondary amines available for reaction. For instance, the secondary amine-based adhesion promoting component may be represented as within the following structure I:

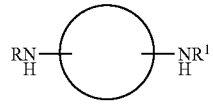

I where R and $R^1$ may be the same or different and may be selected from $C_{1-12}$ alkyl, $C_{1-12}$ alkenyl, $C_{5-12}$ cyclo or bicycloalkyl, $C_{6-18}$ aryl, and derivatives thereof, and O may be selected from $C_{1-12}$ alkylene, $C_{1-12}$ alkenylene, $C_{5-12}$ cyclo or bicycloalkylene, $C_{5-12}$ cyclo or bicycloalkenylene, $C_{6-18}$ arylene, and derivatives thereof.

The secondary amine-based adhesion promoting component should be used in the inventive compositions in an amount within the range of about 5 to about 30 weight percent, with about 13 to about 20 weight percent being particularly desirable, depending of course on the identity of the chosen secondary amine-based adhesion promoting component.

As employed herein, the term "curing agents" refers to polymerization promoters, co-curing agents, catalysts, initiators or other additives designed to participate in or promote curing of the adhesive formulation. With respect to epoxide-based adhesive formulations, such curing agents include polymerization promoters and catalysts such as, for example, anhydrides, amines, imidazoles, amides, thiols, carboxylic acids, phenols, dicyandiamide, urea, hydrazine, hydrazide, amino-formaldehyde resins, melamine-formaldehyde resins, amine-boron trihalide complexes, quaternary ammonium salts, quaternary phosphonium salts, tri-aryl sulfonium salts, di-aryl iodonium salts, diazonium salts, and the like, as well as combinations of any two or more thereof, optionally also including a transition metal complex. Presently preferred curing agents and catalysts for epoxide-based formulations include anhydrides, amines, imidazoles, and the like.

Transition metal complexes contemplated for use herein may be chosen from a variety of organometallic materials or metallocenes as can be readily identified by those of skill in the art.

As readily recognized by those of skill in the art, curing agents contemplated for use in the practice of the present invention will vary with the reactive functionality(ies) present, the presence of optional co-reactant(s), and the like. Typically, the quantity of curing agent will fall in the range of about 1 weight % up to about 50 weight % of the total composition, with presently preferred amounts of curing agent falling in the range of about 5 weight % up to about 40 weight % of the total composition.

Initiators contemplated for use with epoxide-based adhesive formulations include hydroxy functionalized compounds such as, for example, alkylene glycols. Preferred alkylene glycols include ethylene glycols and propylene glycols.

Fillers contemplated for optional use in the practice of the present invention may optionally be conductive (electrically and/or thermally). Electrically conductive fillers contemplated for use in the practice of the present invention include, for example, silver, nickel, gold, cobalt, copper, aluminum, graphite, silver-coated graphite, nickel-coated graphite, alloys of such metals, and the like, as well as mixtures thereof. Both powder and flake forms of filler may be used in the adhesive compositions of the present invention. Preferably, the flake has a thickness of less than about 2 microns, with planar dimensions of about 20 to about 25 microns. Flake employed herein preferably has a surface area of about 0.15 to 5.0 $m^2/g$ and a tap density of about 0.4 up to about 5.5 g/cc. It is presently preferred that powder employed in the practice of the invention has a diameter of about 0.5 to 15 microns. If present, the filler typically comprises in the range of about 30% up to about 70% by weight of the adhesive formulation.

Thermally conductive fillers contemplated for optional use in the practice of the present invention include, for example, aluminum nitride, boron nitride, silicon carbide, diamond, graphite, beryllium oxide, magnesia, silica, alumina, and the like. Preferably, the particle size of these fillers will be about 20 microns. If aluminum nitride is used as a filler, it is preferred that it be passivated via an adherent, conformal coating (e.g., silica, or the like).

Electrically and/or thermally conductive fillers are optionally (and preferably) rendered substantially free of catalytically active metal ions by treatment with chelating agents, reducing agents, nonionic lubricating agents, or mixtures of such agents. Such treatment is described in U.S. Pat. No. 5,447,988, which is incorporated by reference herein in its entirety.

Optionally, a filler may be used that is neither an electrical nor thermal conductor. Such fillers may be desirable to impart some other property to the adhesive formulation such as, for example, reduced thermal expansion of the cured adhesive, reduced dielectric constant, improved toughness, increased hydrophobicity, and the like. Examples of such fillers include perfluorinated hydrocarbon polymers (i.e., TEFLON™), thermoplastic polymers, thermoplastic elastomers, mica, fumed silica, fused silica, glass powder, and the like.

Flexibilizers (also called plasticizers) contemplated for optional use in the practice of the present invention include branched polyalkanes or polysiloxanes that lower the $T_g$ of the formulation. Such flexibilizers include, for example, polyethers, polyesters, polythiols, polysulfides, and the like. If used, flexibilizers typically are present in the range of about 0.5% up to about 30% by weight of the formulation.

Dyes contemplated for optional use in the practice of the present invention include nigrosine, Orasol blue GN, phthalocyanines, and the like. When used, organic dyes in relatively low amounts (i.e., amounts less than about 0.2% by weight) provide contrast.

Pigments contemplated for optional use in the practice of the present invention include any particulate material added solely for the purpose of imparting color to the formulation, e.g., carbon black, metal oxides (e.g., $Fe_2O_3$, titanium oxide), and the like. When present, pigments are typically present in the range of about 0.5 up to about 5 weight %, relative to the weight of the base formulation.

In accordance with another embodiment of the present invention, there are provided methods for adhesively attaching a device to a substrate, such methods comprising dispensing an invention adhesive formulation onto a substrate and/or a device or between the substrate and the device to form an assembly, and exposing the assembly to conditions sufficient to cure the adhesive.

Conditions suitable to cure invention adhesive formulations comprise subjecting invention adhesive formulations to a temperature of at least about 120° C. but less than about 190° C. for about 0.5 up to about 60 minutes. This rapid, short duration heating can be accomplished in a variety of ways, e.g., with an in-line heated rail, a belt furnace, a curing oven, or the like.

In accordance with yet another embodiment of the present invention, there are provided assemblies produced by the above-described methods.

In accordance with a further embodiment of the present invention, there are provided methods for adhesively attaching a first article to a second article, such methods comprising:

(a) applying an invention formulation to the first article, (b) bringing the first and second article into intimate contact to form an assembly wherein the first article and the second article are separated only by the adhesive composition applied in step (a), and thereafter, (c) subjecting the assembly to conditions suitable to cure the adhesive formulation.

In accordance with yet another embodiment of the present invention, there are provided assemblies produced by the above-described methods.

In accordance with a still further embodiment of the present invention, there are provided methods for encapsulating electronic components, such methods comprising:

applying an invention formulation to the component, and curing the formulation.

In accordance with yet another embodiment of the present invention, there are provided assemblies produced by the above-described methods.

In accordance with a still further embodiment of the present invention, there are provided methods for encapsulating electronic components, such methods comprising curing a formulation according to the invention after application of the formulation to the component.

In accordance with yet another embodiment of the present invention, there are provided assemblies produced by the above-described methods.

In accordance with a still further embodiment of the present invention, there are provided articles comprising an electronic component adhesively attached to a circuit board. wherein the electronic component is adhesively attached to the board by a cured aliquot of invention formulation.

In accordance with still another embodiment of the present invention, there are provided articles comprising an electronic component adhesively attached to a circuit board, wherein the electronic component is adhesively attached to the board by a cured aliquot of invention formulation.

Those of skill in the art recognize that many different electronic packages would benefit from preparation using the invention formulations described herein. Examples of such packages include ball grid arrays, super ball grid arrays, IC memory cards, chip carriers, hybrid circuits, chip-on-board, multi-chip modules, pin grid arrays, CSPs, and the like.

The invention will now be described in greater detail by reference to the following non-limiting examples.

EXAMPLES

Materials:

All starting materials and solvents were purchased from the Aldrich Chemical Company, and were used without further purification, unless otherwise specified.

CBB-3098, a carboxylic acid functionalized poly(butyl acrylate) co-polymer, was supplied by Esprix Technologies.

Chemical analyses:

Proton Nuclear Magnetic Resonance analyses (1H NMR) were performed on a Varian 300 Hz Gemini Spectrophotometer. Infrared spectra (IR) were recorded on a Perkin-Elmer Spectrum One FTIR Spectrophotometer. Epoxy equivalent weight (EEW) measurements were performed according to standard titrometric methodology, using a 0.15 g sample and 0.1N $HClO_4$/HOAc titrant. Acid determinations were also measured according to standard titrometric methodology, using 1N methanolic KOH titrant.

Example 1

Synthesis of Epoxidized Acrylate

Epoxidized polybutylacrylates were synthesized by heating carboxylic acid terminated poly (butyl acrylate, CBB, with access bisphenol F diglycidyl ether (BPF-DGE) and isolated as mixtures in the unreacted epoxy monomer. Under these conditions, the free carboxylic acid is esterified to give the corresponding β-hydroxyester by a ring opening reaction of one or more of the epoxide groups as shown in FIG. 1. The reaction conditions used are similar to those typically employed for the epoxy modification of CTBN resins (see R. S. Drake et al, in *Epoxy Resin Chemistry II*, ACS Symposium Series 221, R. S. Bauer, ed., American Chemical Society, Washington D.C. 1983, p 1).

Figure 2:
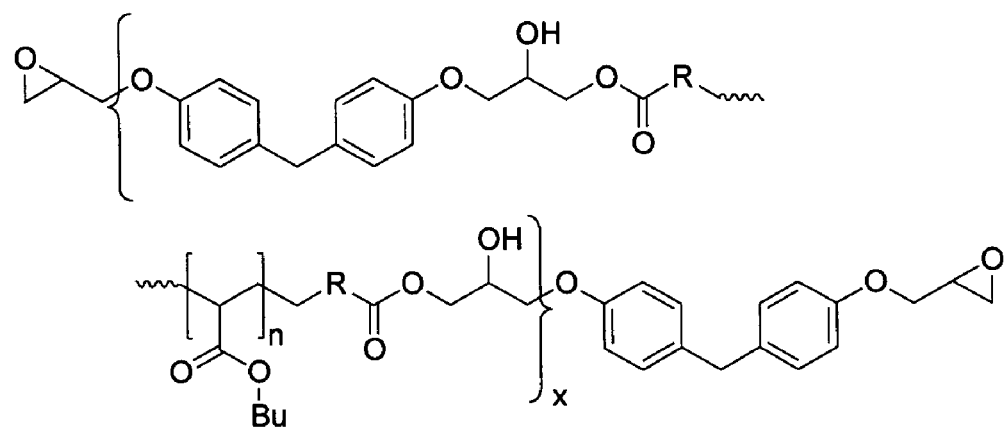
FIG. 2 presents a partial structure of an extended epoxidized poly(butyl acrylate) resin according to the present invention. The branching that arises from the multi-functional acrylate is not shown in the figure.

Gellation is avoided in the reaction by employing a large excess of the diepoxide monomer. The reaction product is a mixture of epoxidized polyacrylates and unreacted BPF-DGE. The amount of unreacted monomer was estimated from the $^1$H NMR spectrum by comparing the integral ratio of epoxide group proton at δ=3.3 (—CH—O—) to the normalized aromatic signal δ=6.8–7.1 before and after the reaction. The formation of the product was also confirmed by the emergence of a strong hydroxyl peak in the IR spectrum at ~3500 cm$^{-1}$. The reaction composition contains, in addition to the simple adduct represented by the structure in FIG. 1, small amounts of extended polymer resulting from the reaction of an initial epoxidized adduct with further carboxylic acid functionalized polyacrylate as shown in FIG. 2.

Figure 3:
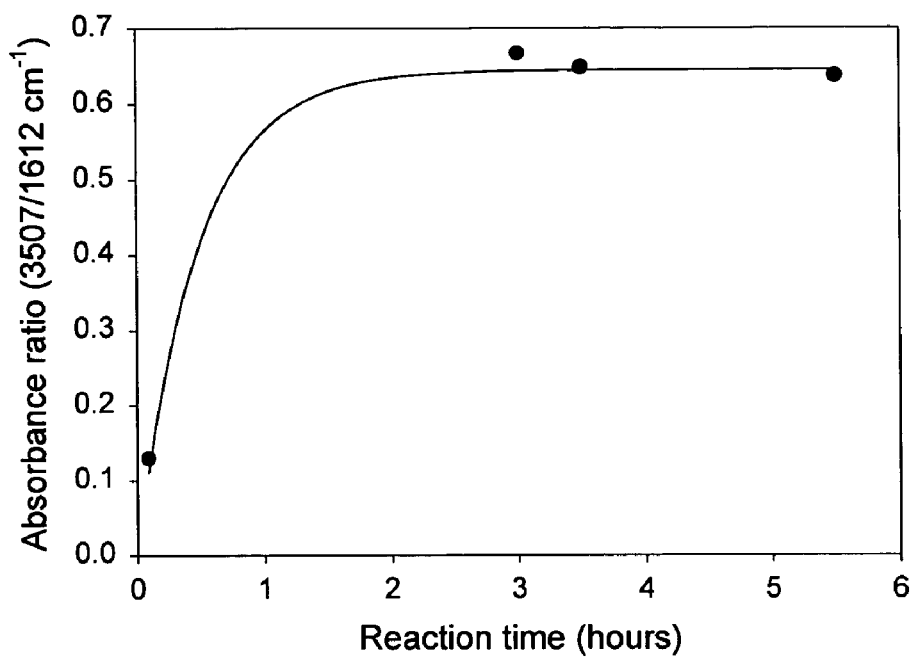
FIG. 3 presents the normalized FTIR absorbency for the reaction of carboxyl functional polyacrylate with multi-functional epoxy monomers, indicating formation of β-hydroxyester during reaction of carboxylic acid terminated polyacrylate and bisphenol F diglycidyl ether (BPF-DGE) epoxy monomer.

The reaction was carried out at CBB/BPF-DGE equivalent weight ratios 1/4, 1/7 and 1/10 (corresponding to approximate mole ratios=0.11, 0.06 and 0.04 respectively) (see experimental details). Neither catalysts nor solvents were employed. The progress of the reaction was followed by the emergence of the hydroxyl absorbance peak at 3507 cm$^{-1}$ in the infrared spectrum of the reaction mixture, as shown in FIG. 3.

Using the absorbance at 1612 cm$^{-1}$ as an internal standard, the conversion of the polyacrylate to the corresponding β-hydroxyester was quantified in terms of the ratio of absorbance bands $A_{3507}/A_{1612}$.

The reaction proceeds rapidly during the first hour and more slowly thereafter. It is essentially complete within 3 hours after which no further increase in hydroxyl absorbance with observed. The analyses of products from several different reaction batches are listed in Table 1.

A typical procedure is as follows (run #4, Table 1): A mixture of carboxylic acid terminated poly (butyl acrylate), CBB-3098 (113.172 g; 0.18 equivalents of carboxylic acid) and bisphenol F diglycidylether (BPF-DGE) (105.679 g; 0.72 equivalents of epoxide) was heated at 140° C. for 6 hours to give a light yellow colored viscous liquid (213.438 g; 98% yield). The epoxide equivalent weight (EEW) was 594 (see Table 1 for additional details).

TABLE 1

Analysis of various BPF-DGE/CBB reaction mixtures

| Run # | BPF-DGE/CBB EW ratio in feed | Epoxy EW | Viscosity (mPa · s, 25° C.) | Mole fraction Unreacted epoxy |
|---|---|---|---|---|
| 1 | 10 | 278 | 17,400 | 0.81 |
| 2 | 7 | 353 | 30,000 | 0.83 |
| 3 | 4 | 623 | 136,000 | 0.42 |
| 4 | 4 | 594 | 183,000 | 0.52 |
| 5 | 4 | 514 | 148,000 | 0.56 |
| 6 | 4 | 562 | 118,500 | 0.62 |

Figure 4:
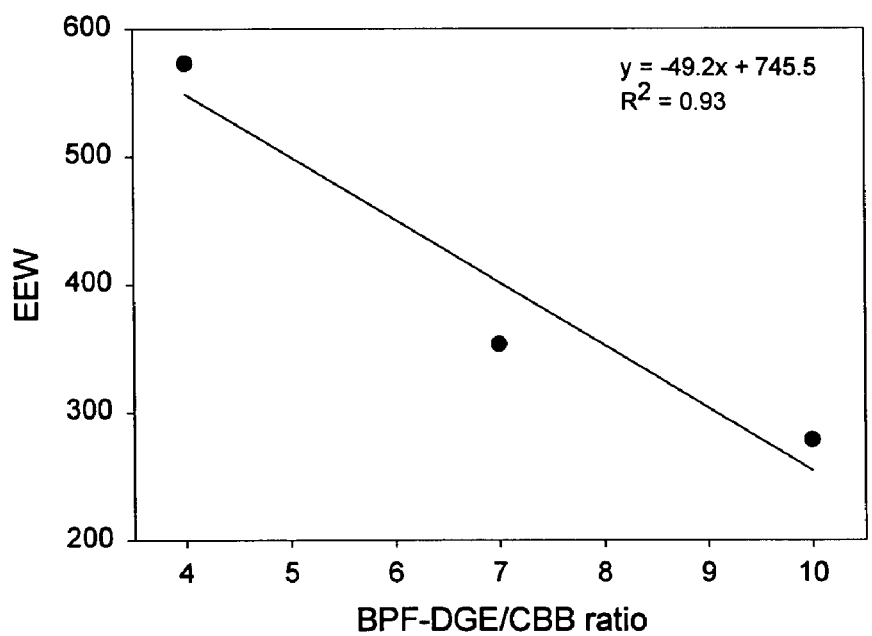
FIG. 4 illustrates the average epoxide equivalent weight (EEW) of epoxidized polyacrylate as a function of the reaction stoichiometry.

There is clearly a strong inverse correlation between the epoxy equivalent weight of the final product and the equivalent weight ratio of epoxide monomer to CBB polymer (FIG. 4). Runs #3, 4, 5 and 6 were performed under almost identical conditions and in these experiments, a reasonably good reproducibility of epoxide equivalent weight was observed (±8% of the mean value; standard deviation of EEW for runs #3, 4, 5 and 6 is 46.7).

Figure 5:
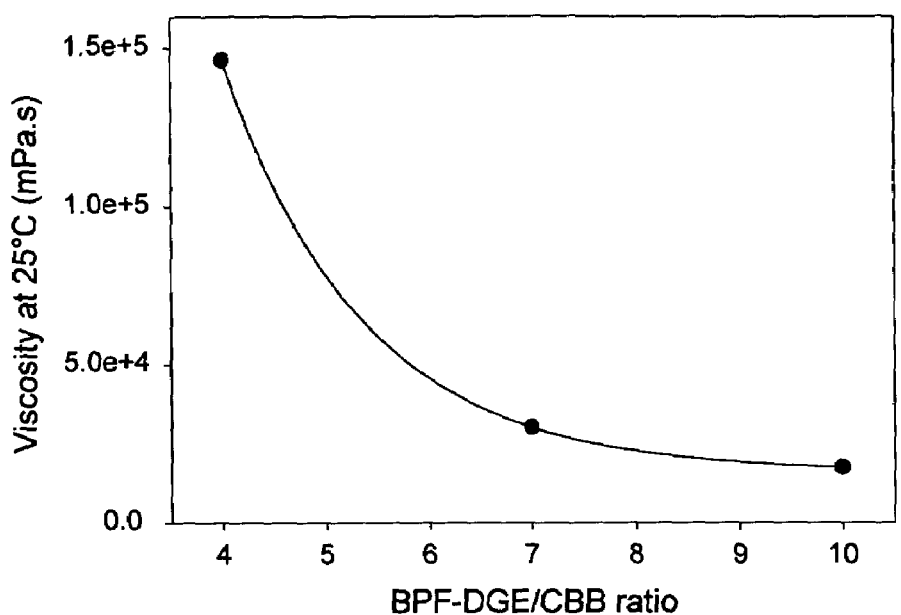
FIG. 5 illustrates the dependence of product viscosity on the equivalent weight ratio of epoxy monomer to the carboxylic acid functionalized polyacrylate, BPF-DGE/CBB.

Similarly, the viscosity of the final mixture was observed to decrease with increasing EW ratio of CBB/BPF-DGE (FIG. 5). In this case, identical runs, i.e. #3, 4, 5 and 6, were observed to vary in final viscosity by ±19% of the mean value (standard deviation of viscosity measurements for runs #3, 4, 5 and 6 is 27,427). The variability of these data can be attributed in part to small differences in the reaction temperature and mixing efficiency from variable batch sizes of the different reaction runs (50–1000 g).

From the NMR analysis of the products and stoichiometry of the reaction mixtures can be estimated. The composition of the various polymers and the results are shown in Table 2.

TABLE 2

Estimated composition of various BPF-DGE/CBB mixtures.

| Run # | BPF-DGE/CBB Ratio | Epoxidized rubber (%) | Unreacted BPF-DGE (%) | Poly BA rubber (%) |
|---|---|---|---|---|
| 1 | 10 | 48 | 52 | 27 |
| 2 | 7 | 55 | 45 | 35 |
| 3 | 4 | 91 | 9 | 48 |
| 4 | 4 | 86 | 14 | 48 |
| 5 | 4 | 84 | 16 | 48 |
| 6 | 4 | 81 | 19 | 48 |

Figure 6:
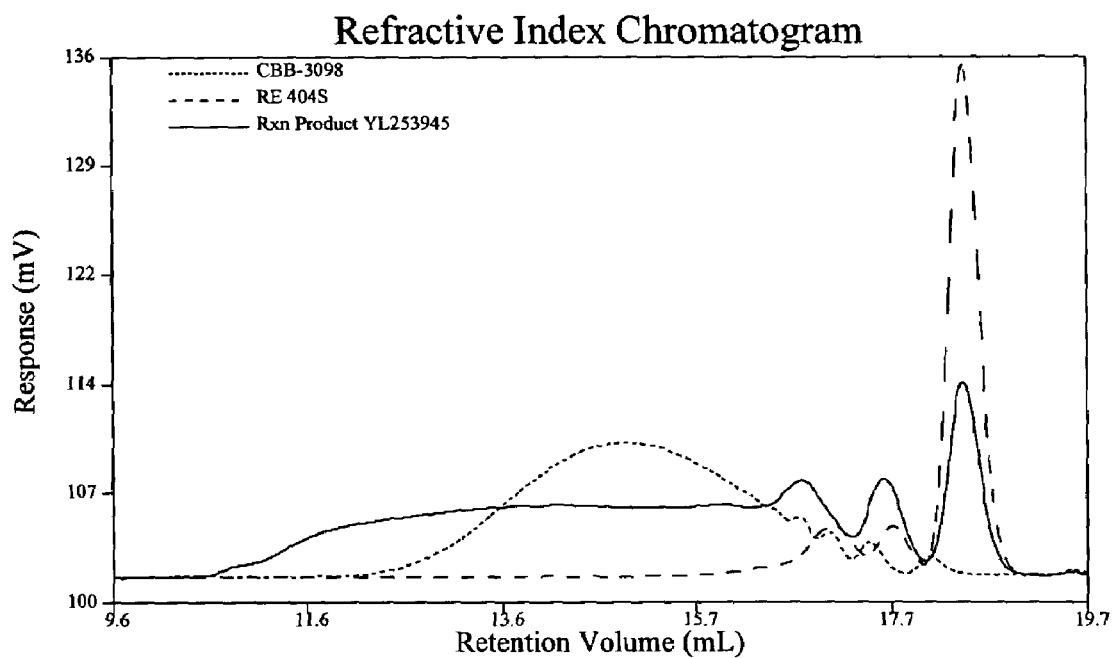
FIG. 6 presents a GPC chromatogram of CBB-3098 (short dashes), BPF-DGE epoxy monomer (RE 404S; long dashes) and the reaction product of these two materials (YL253945; solid line).

GPC analysis was carried out on the reaction product from run #6 along with the starting materials bis-F epoxy monomer (RE404) and polyacrylate (CBB). The results, presented in FIG. 6, show the polymeric component of the mixture does not have a well defined maximum in its molecular weight distribution, but is clearly higher in molecular weight and has increased polydispersity compared to the starting polyacrylate (Mn=1,680; MWD=1.59). This result is consistent with the structures proposed above. The presence of residual unreacted epoxy monomer is also clearly evident from the chromatogram (component eluting at ~18.3 mL; Mp=290). An independent external calibration of RE404 epoxy monomer concentration versus peak area was also performed. From this the concentration of unreacted monomer in the product mixture was found to be 14.4% by weight, which is in very good agreement with the 19% value estimated by NMR analysis (see Table 2).

Example 2

Preparation of Prototype Underfill Adhesive Formulations

Bisphenol F diglycidyl ether epoxy monomer (RE404), toughening agent, Co(AcAc)$_3$ (added as 1% premix in RE404), Unilink 4100, A-137 and silica were blended together using a mechanical mixer and vacuum treated at room temperature for about 30 minutes to remove small amounts of volatile materials present in the A-137 silane. The mixture was then heated to 100° C. (to promote silylation of silica filler) and cooled to room temperature. A-1100 silane and imidazole catalyst were then added and the mixture stirred for a further 10 minutes. The composition was vacuum treated to remove air bubbles and used immediately or stored at −20° C. until needed.

Formulations containing different levels of 4/1 epoxidized poly (butyl acrylate) BPF-DGE/CBB adducts were prepared as shown in Table 3. All of the compositions contain the same stoichiometric balance of curing agents and catalysts to epoxide monomers, although there are small variations in the amounts of silica used.

TABLE 3

Formulations containing BPF-DGE/CBB mixture as a toughening agent

| Component | A | B | C | D | E | F |
|---|---|---|---|---|---|---|
| 4/1 BPF-DGE/CBB | 0 | 8.28 | 13.59 | 24.39 | 0 | 0 |
| 7/1 BPF-DGE/CBB | 0 | 0 | 0 | 0 | 13.80 | 0 |
| 10/1 BPF-DGE/CBB | 0 | 0 | 0 | 0 | 0 | 12.87 |
| BPF-DGE | 25.24 | 21.49 | 19.11 | 14.26 | 17.16 | 16.67 |
| 1% Co premix | 8.78 | 8.36 | 7.98 | 7.39 | 8.16 | 3.10 |
| N,N'-bis-isobutyl-p-phenylenediamine | 3.29 | 3.09 | 3.00 | 2.66 | 3.04 | 8.29 |
| octyl triethoxy silane | 0.39 | 0.37 | 0.36 | 0.32 | 0.37 | 0.38 |
| Silica, SO-E5 | 60.33 | 56.50 | 54.19 | 49.36 | 55.64 | 56.84 |
| 3-aminopropyl triethoxysilane | 0.64 | 0.60 | 0.57 | 0.53 | 0.60 | 0.60 |
| 2-propyl imidazole | 1.33 | 1.31 | 1.20 | 1.09 | 1.23 | 1.25 |

Formulation A, which does not contain added rubber, was included in the tests for comparative purposes. Formulations B–F contain various amounts of different BPF-DGE/CBB mixtures. In formulations B, C and D, the amount of specific additive, 4/1 BPF-DGE/CBB, and hence the % rubber is varied. In formulations B, E and F, the equivalent ratio is varied, while the rubber concentrations are maintained at similar levels. Samples of each formulation were cured as already described and cut specimens subjected to fracture toughness testing. Fracture toughness testing was measured in terms of the critical energy release rate, Gq, and the stress intensity factor, Kq (both of which are discussed in greater detail below). The results are summarized in Table 4. Note that % rubber indicates the amount of CBB polyarcylate component and not the amount of epoxidized adduct used in the above formulations.

TABLE 4

Fracture toughness test results for underfill adhesive containing various BPF-DGE/CBB rubbers as toughening agents.

| Formulation | CBB/BPF-DGE ratio | Rubber (weight %) | Gq (lb/in) | Kq (MPa√m) |
|---|---|---|---|---|
| A | 0 | 0 | 1.52 ± 0.20 | 1.42 ± 0.18 |
| B | 0.25 | 4.0 | 2.23 ± 0.14 | 1.53 ± 0.06 |
| C | 0.25 | 6.6 | 2.54 ± 0.19 | 1.59 ± 0.10 |
| D | 0.25 | 11.8 | 4.16 ± 0.31 | 1.59 ± 0.07 |
| E | 0.14 | 4.8 | 2.09 ± 0.11 | 1.46 ± 0.03 |
| F | 0.10 | 4.8 | 1.63 ± 0.18 | 1.31 ± 0.05 |

Figure 7:
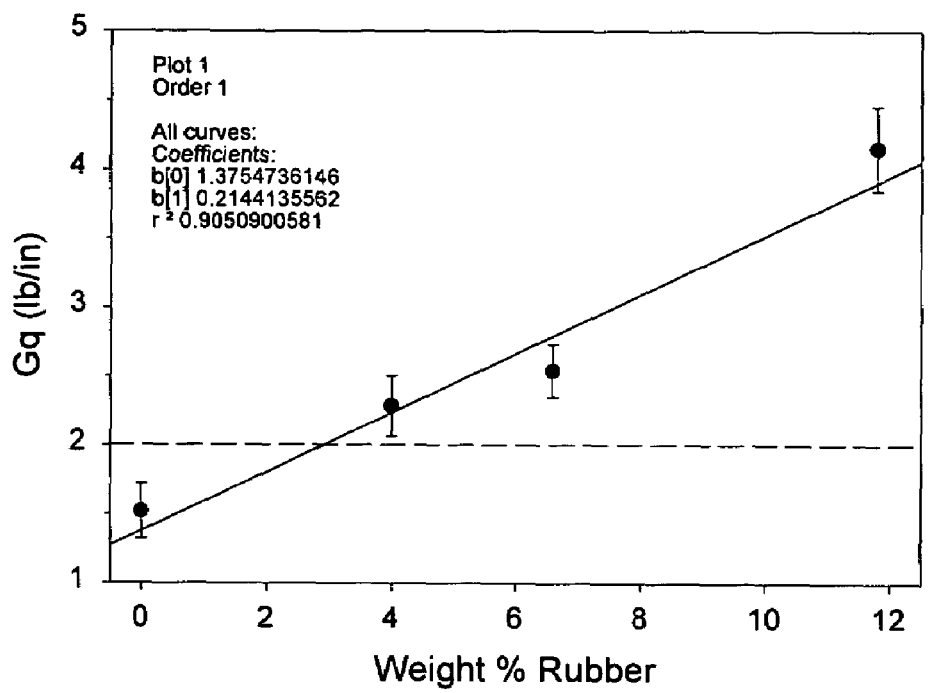
FIG. 7 illustrates the variation of Gq as a function of rubber concentration added as 4/1 BPF-DGE/CBB mixture. Error bars represent the standard deviation of an average of 7 specimens. Dashed line indicates the minimum required value.

Comparing the results of formulations A, B, C and D, the fracture toughness, Gq, increases linearly with the amount of added polyacrylate rubber as indicated in FIG. 7. The minimum specification value for fracture toughness (Gq) of 2.0 lb/in and flow, by capillary force, a distance of 20 mm through a 2-mil gap between a pair of microscope slides in <180 seconds at 120° C., is obtained when the rubber concentration (as % polyacrylate component) exceeds about 3% by weight and continues to increase to a loading of 12%.

The Kq value also increases with the amount of added rubber but reaches a plateau value of 1.59 Mpa√m at a loading of about 7%.

Figure 8:
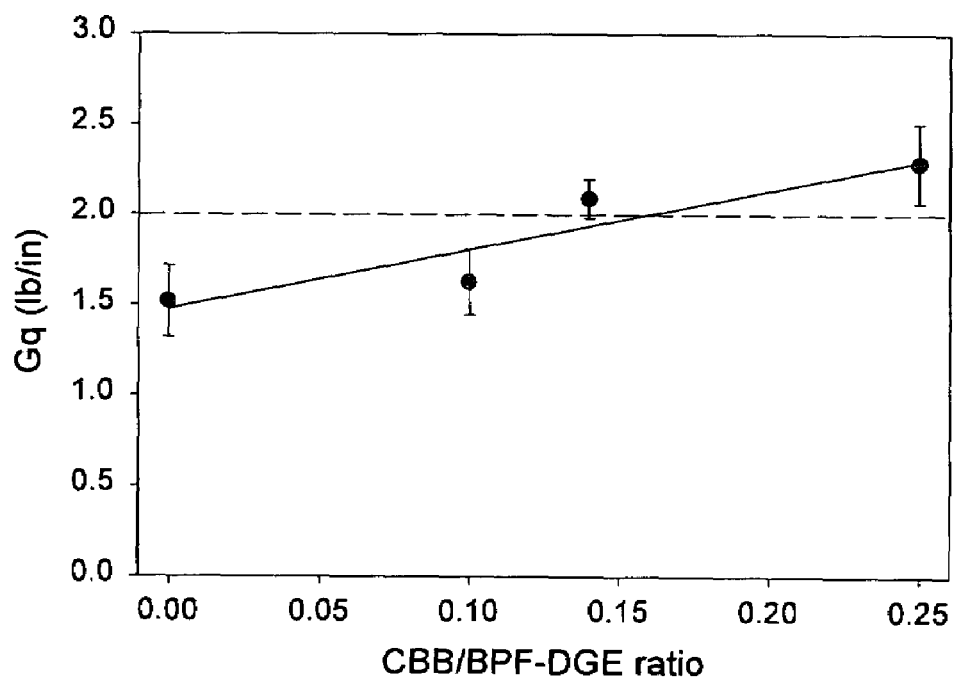
FIG. 8 illustrates the variation of Gq as a function of CBB/BPF-DGE equivalent weight ratio.

Comparing the results of formulations A, B, E and F, the fracture toughness, Gq, increases by a small but significant amount as the polyacrylate/epoxy equivalent weight ratio in the CBB/BPF-DGE adduct is increased (FIG. 8). Since the amount of polyacrylate rubber in formulations B, E and F does not vary significantly (4–5% range), it can be concluded that the structure and composition of the adduct influences the fracture toughness. This effect can be attributed to the higher molecular weight between crosslinks for adducts prepared at higher CBB/epoxy ratios. As the amount of CBB in the adduct is increased, the epoxide equivalent weight of the product is enhanced due to formation of higher molecular weight CBB/epoxy products (see Table 1). In addition, the concentration of extended polymer in the final mixture increases as the ratio of CBB/epoxy in the reaction mixture increases (see Table 2). The overall effect of increasing CBB/epoxy ratio is to increase the molecular weight between crosslinks in the cured adhesive, which for a series of epoxidized butadiene-acrylonitrile copolymers, is known to enhance fracture toughness (see A. Kinloch in *Rubber-Toughened Plastics, Advances in Chem. Series* 222, C. Riew ed., American Chemical Society, Washing D.C. 1987, p 67).

Example 3

Physical and Materials Testing

Viscosity measurements were performed on a Brookfield Model DV-111 Programmable Rheometer at 25° C. Capillary flow measurements were performed by allowing material to flow 20 mm at 120° C. through a 2-mil gap between a pair of microscope slides. Fracture toughness testing was carried out according to ASTM D5045-99 (area method) employing samples that were 3 mm thick. The critical energy release rate (Gq) and stress intensity factor (Kq) were determined in an Instron mechanical tester at a loading rate of 10 mm/minute using three-point bend geometry and a crack induced from a single edge cut notch (2.5 mm). Specimens for fracture toughness measurements were prepared as follows: a pair of glass plates (20.5×12.5×0.4 cm$^3$) was treated with release agent and heated at 121° C. for one hour. The treated plates were assembled into an open-topped mold by means of a U-shaped Teflon gasket/spacer (3.0 mm in thickness) and held together by means of external clamps. The mold was filled with the adhesive formulation and heated to 90° C. under reduced pressure to remove all air bubbles (10–30 minutes). The adhesive was then cured in situ by heating at 100° C. for 1 hour and 140° C. for 2 hours. The cured product was removed from the mold, cut into test coupons (12.5 mm×63.5 mm) which were edge-sanded and measured. Dynamic mechanical analysis (DMA) was performed on a Rheometric RDA II according to ASTM D5279-95 (torsion mode; frequency=10 rad/s and strain=0.19%).

Underfill adhesives are generally applied to component parts by capillary filling after the chip components have been assembled and aligned with the requisite conductive receptors located on the substrate. To enable reasonable production rates and to ensure component reliability the adhesive is required to fill the bondline gap quickly and completely. The underfill adhesive should flow, by capillary force, a distance of 20 mm through a 2-mil gap between a pair of microscope slides in ≦180 seconds at 120° C. The formulated products described above were tested to determine if they conformed to this specification. The results are presented in Table 5.

TABLE 5

Capillary flow results for toughened underfill formulations

| Formulation | Toughening Agent | Weight % rubber | Flow time (seconds) |
|---|---|---|---|
| B | 4/1 BPF-DGE/CBB | 4.0 | 140 |
| D | 4/1 BPF-DGE/CBB | 11.8 | 240 |

Formulations containing the epoxidized polyacrylate were tested at low and high levels of added rubber (formulations B and D). At a rubber loading of 4% the product meets the flow requirement, but fails when the rubber concentration is increased to 12%.

These data can be understood in part on the viscosity differences between the various toughening agents. The average viscosity of the polyacrylate 4/1 BPF-DGE/CBB is 146,000 mPa.s at 25° C. (see Table 1). This material is, therefore, expected to significantly increase the formulation viscosity at high loadings and consequently reduce the capillary flow rates.

Adhesive formulations containing some of the invention toughening agents were evaluated by DMA. The formulations employed in this work were similar to those described above (BPF-DGE, curing agents, catalysts) but without added silica (samples containing silica were found to be too stiff to enable accurate analysis by the method employed). Five formulations containing different amounts of different toughening agents were prepared and evaluated. The results are presented in Table 6. Analyses were conducted over the temperature range −100° C. to +175° C. The glass transition of the unmodified formulation (D−1) was observed at 122° C. with a small secondary transition at −76° C. Addition of ~11% polyacrylate, 10/1 BPF-DGE/CBB (formulation D=2) had no significant effect on the Tg or storage modulus of the cured composition. However, a small increase in the ratio tan $\delta_\beta$/tan $\delta_\alpha$ was observed which may be indicative a small increase in phase separation compared to the control sample. Increasing the polyacrylate loading to ~23% (D−3) resulted in a significant reduction of Tg and a sizable reduction in the stiffness (G'). A beta-transition was not observed in this sample.

TABLE 6

DMA analysis of toughened epoxy formulations

| Formulation | D-1 | D-2 | D-3 |
|---|---|---|---|
| % toughening agent | 0 | 11.2 | 23.4 |
| Glass transition, Tg (° C.) | 122 | 116 | 102 |
| β-transition (° C.) | −76 | −79 | N/D |
| Tan $\delta_\beta$/tan $\delta_\alpha$ | 0.10 | 0.12 | — |
| Storage modulus, G' At 25° C. (Gpa) | 1.6 | 1.7 | 1.2 |
| Storage modulus, G' at 140° C. (Mpa) | 66 | 87 | N/D |

D-1: no added toughening agent;
D-2: epoxidized polyacrylate 10/1 BPF-DGE/CBB
D-3: epoxidized polyacrylate 4/1 BPF-DGE/CBB;
N/D: not determined

What is claimed is:

1. A method to improve the fracture toughness of a curable epoxy-based adhesive composition, the method comprising adding to the adhesive composition an effective amount of a curable epoxy-extended branched polyacrylate having at least one β-hydroxyester linkage, wherein the branched polyacrylate from which the epoxy-extended branched polyacrylate is derived has a number average molecular weight in the range of about 1000 up to about 10,000, an average functionality of at least about 2.2, and the functionality of the branched polyacrylate from which the epoxy-extended branched polyacrylate is derived is a carboxylic acid.

2. A curable adhesive formulation comprising:
 a curable epoxy resin,
 a curing agent,
 a curable epoxy-extended branched polyacrylate having at least one β-hydroxyester linkage, wherein the branched polyacrylate from which the epoxy-extended branched polyacrylate is derived has a number average molecular weight in the range of about 1000 up to about 10,000, an average functionality of at least about 2.2, and the functionality of the branched polyacrylate from which the epoxy-extended branched polyacrylate is derived is a carboxylic acid; and
 optionally, a filler.

3. The adhesive formation of claim 2 wherein the formulation contains substantially no latent curing agent; and the cure onset temperature of the curable epoxy resin is less than about 220° C.

4. The adhesive formulation of claim 2 wherein said curing agent is selected from the group consisting of anhydrides, amines, imidazoles, amides, thiols, carboxylic acids, phenols, dicyandiamide, urea, hydrazine, hydrazide, amino-formaldehyde resins, melamine-formaldehyde resins, amine-boron trihalide complexes, quaternary ammonium salts, quaternary phosphonium salts, tri-aryl sulfonium salts, di-aryl iodonium salts, diazonium salts, and combinations of any two or more thereof.

5. The adhesive formulation of claim 2 wherein said epoxy-extended branched polyacrylate is prepared by reacting a carboxylic acid functionalized branched polyacrylate with a multi-functional epoxy monomer.

* * * * *